United States Patent [19]

Itoh et al.

[11] Patent Number: 4,982,422
[45] Date of Patent: Jan. 1, 1991

[54] TERMINATING CIRCUIT IN A BATTERY FEED CIRCUIT OF AN ELECTRONIC EXCHANGE SYSTEM

[75] Inventors: Shin-ichi Itoh, Tokyo; Kenji Takato, Kawasaki; Yozo Iketani, Yokohama; Yuzo Yamamoto, Kawasaki, all of Japan

[73] Assignee: Fujitsu Limited, Kawasaki, Japan

[21] Appl. No.: 409,064

[22] Filed: Sep. 19, 1989

[30] Foreign Application Priority Data

Sep. 19, 1988 [JP] Japan ................................ 63-232708

[51] Int. Cl.⁵ .......................................... H04M 19/00
[52] U.S. Cl. ...................................... 379/324; 379/413
[58] Field of Search ............... 379/324, 322, 413, 400, 379/399

[56] References Cited

U.S. PATENT DOCUMENTS

| | | | |
|---|---|---|---|
| 4,677,669 | 6/1987 | Kawami et al. ...................... | 379/413 |
| 4,706,281 | 11/1987 | Cubbison, Jr. ...................... | 379/322 |

FOREIGN PATENT DOCUMENTS

| | | | |
|---|---|---|---|
| 0151307 | 11/1979 | Japan .................................... | 379/324 |
| 0099874 | 7/1980 | Japan .................................... | 379/324 |
| 0044167 | 3/1984 | Japan .................................... | 379/413 |
| 0314060 | 12/1988 | Japan .................................... | 379/413 |

*Primary Examiner*—Thomas W. Brown
*Attorney, Agent, or Firm*—Staas & Halsey

[57] ABSTRACT

Disclosed is a terminating circuit in a battery feed circuit of an electronic exchange system. The battery feed circuit comprises two transconductance amplifiers connected by a coupling capacitor, for supplying a direct current through a ring terminal and a tip terminal to a load. Each of the transconductance amplifiers comprises an operational amplifier; a resistor connected between the output end of the operational amplifier and the tip terminal or the ring terminal, and an impedance unit connected between the inverting input terminal of the operational amplifier and the output end. The impedance unit has an impedance determined in such a way that the required terminating impedance of the battery feed circuit when viewed from the tip terminal and the ring terminal is formed only by the internal elements including the impedance means and the resistor, whereby an external larger-size capacitance capacitor for matching becomes unnecessary.

14 Claims, 5 Drawing Sheets

TERMINATING CIRCUIT IN A BATTERY FEED CIRCUIT OF AN ELECTRONIC EXCHANGE SYSTEM

BACKGROUND OF THE INVENTION

1. Field of the Invention

The present invention relates to a terminating circuit in a battery feed circuit of an electronic exchange system. More particularly, the present invention is directed to a circuit for realizing the terminating impedance of a battery feed circuit, which supplies a direct current to subscriber lines or to trunk lines, by an impedance within a transconductance amplifier.

2. Description of the Related Art

The transconductance amplifier is described in, for example, the "Operational Amplifier Circuit Design Handbook" in the Handbook of Operational Circuit Design, D. F. Staut, edited by Milton Kaufman, 1976, McGraw-Hill, Inc., New York, or in "A High-Voltage IC for a Transformerless Trunk and Subscriber Line Interface," by Dennis W. Aull, IEEE Journal of Solid State Circuits, Vol.SC-16, No. 4, August, 1981.

A prior art battery feed circuit is disclosed in U.S. Pat. No. 4,677,669, issued on June 30, 1987.

To supply a current to subscriber lines or to transit trunk lines in an electronic exchange system, a battery feed circuit must be constructed which has a characteristic having a resistance of about 200 Ω for a direct current and having a high impedance for a differential alternating current. The battery feed circuit must have an impedance matching the load connected to the subscriber lines or to the transit trunk lines.

A terminating impedance of the lines for an alternating current, from the load side, is generally determined as, for example, 600 Ω+2 μF or 900 Ω+2 μF. Conventionally, the terminating impedance is connected between the subscriber lines, i.e., between a tip line terminal and a ring line terminal. The 2 μF capacitor should have a tolerance voltage of −48 V applied between the subscriber lines, and further, should have a high precision capacity satisfying a return loss regulation. Accordingly, a problem arises in the conventional terminating circuit in that the size of the capacitor is large, and the presence of this large size capacitor disadvantageously enlarges the size of the battery feed circuit as a whole.

SUMMARY OF THE INVENTION

An object of the present invention is to provide a terminating circuit of a battery feed circuit having a stable terminating impedance, without using large-size parts, by appropriately setting an impedance connected to an operational amplifier in a transconductance amplifier in the battery feed circuit so that the impedance is equal to the terminating impedance of the lines when viewed from the output side of the operational amplifier.

To obtain the above object, according to the present invention, there is provided a terminating circuit in a battery feed circuit of an electronic exchange system. The battery feed circuit comprises two transconductance amplifiers connected by a coupling capacitor for supplying a direct current through a ring terminal and a tip terminal to a load. Each of the transconductance amplifiers comprises: an operational amplifier; a resistor connected between the output end of the operational amplifier and the tip terminal or the ring terminal; and an impedance unit connected between the inverting input terminal of the operational amplifier and the output end.

The impedance unit has an impedance determined in such a way that the required terminating impedance of the battery feed circuit when viewed from the tip terminal and the ring terminal is formed only by the internal elements including the impedance unit and the resistor.

According to one aspect of the present invention, the impedance unit comprises a resistor and a capacitor connected in series.

According to another aspect of the present invention, the impedance unit comprises only a resistor.

BRIEF DESCRIPTION OF THE DRAWINGS

The above object and features of the present invention will be more apparent from the following description of the preferred embodiments with reference to the drawings, wherein.

DESCRIPTION OF THE PREFERRED EMBODIMENTS

For a better understanding of the present invention, a conventional circuit will be first described.

Figure 1:
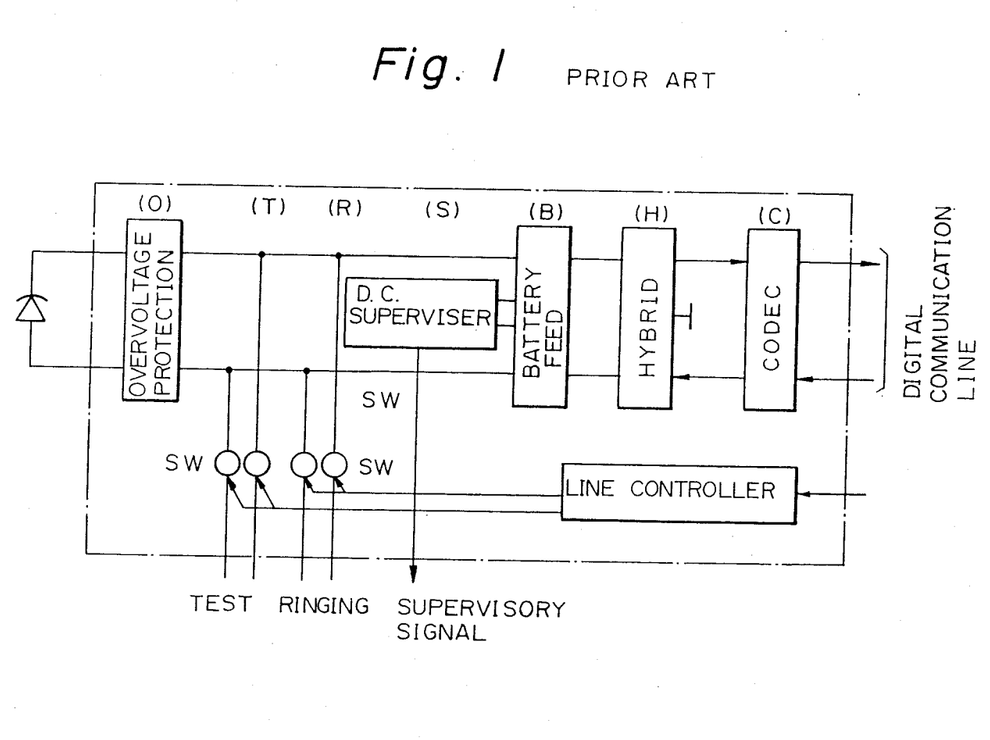
FIG. 1 is a circuit diagram of a conventional subscriber line circuit for explaining the background of the present invention.

FIG. 1 is a circuit diagram of a conventional subscriber line circuit, for explaining the background of the present invention. In the figure, the subscriber line circuit has the BORSHT functions, i.e., battery feed (B), overvoltage protection (O), ringing (R), supervision (S), hybrid (H), and testing (T) functions. The present invention relates to the battery feed circuit and an improvement of the battery feed (B) function.

Figure 2:
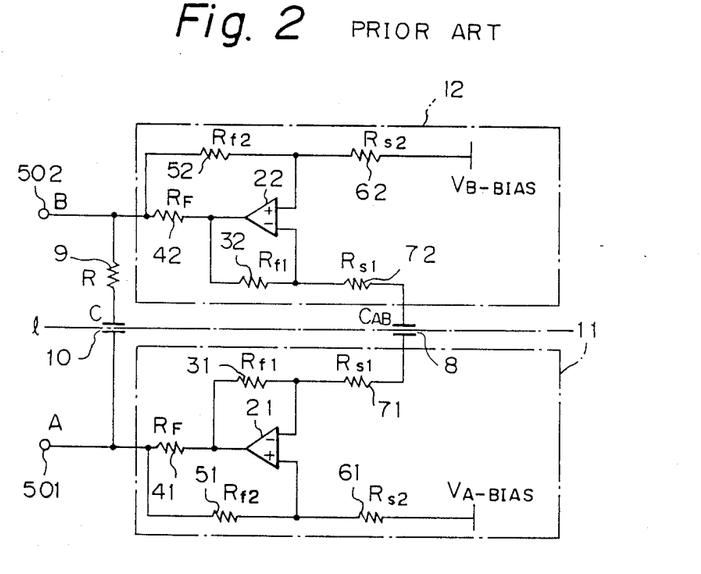
FIG. 2 is a circuit diagram showing a conventional terminating circuit of a battery feed circuit.

FIG. 2 is a circuit diagram showing an example of a terminating circuit in a conventional battery feed circuit. In the figure, 11 and 12 are transconductance amplifiers; 21 and 22 are operational amplifiers; 31 and 32 are feedback resistors; 41 and 42 are resistors connected to the outputs of the operational amplifiers 21 and 22; 51 and 52 and 61 and 62 are voltage dividing resistors, i.e., gain resistors; 71 and 72 are resistors for connecting the transconductance amplifiers 11 and 12; and 8 is a capacitor for cutting a direct current between the transconductance amplifiers 11 and 12.

A resistor 9 and a capacitor 10 are connected in series between a ring line terminal (A) 501 and a tip line terminal (B) 502, to provide a terminating impedance. The resistances of the resistors 31 and 32 are expressed as $R_{f1}$; the resistances of the resistors 41 and 42 are expressed as $R_F$; the resistances of the resistors 51 and 52 are expressed as $R_{f2}$; the resistances of the resistors 61 and 62 are expressed as $R_{s2}$; the resistances of the resistors 71 and 72 are expressed as $R_{s1}$; the capacitance of the capacitor 8 is expressed as $C_{AB}$; and the resistance of the resistor 9 and the capacitance of the capacitor 10 for the terminating impedance are expressed, respectively, as R and C.

In the illustrated circuit, it is assumed that the resistances $R_{f1}$, $R_{f2}$, $R_{s1}$, and $R_{s2}$ are the same, that is, $R_{f1}=R_{f2}=R_{s1}=R_{s2}$. In the following description, both the resistors and the resistances may be expressed by the resistance values, and both the capacitors and the capacitances may be expressed by the capacitance values.

As will be apparent from the figure, the transconductance amplifiers 11 and 12 are symmetric with respect to the coupling capacitor 8.

Figure 3A:
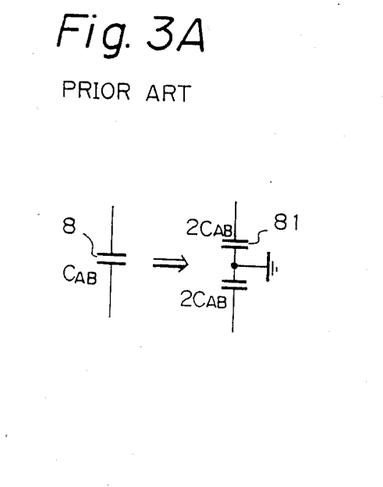
FIG. 3A is a diagram explaining the equivalent circuit of a capacitor when the circuit shown in FIG. 2 is divided into two.
Figure 3B:
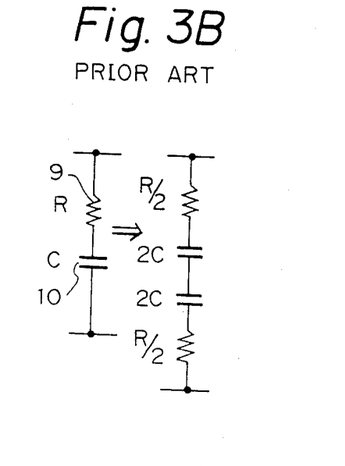
FIG. 3B is a diagram explaining the equivalent circuit of a series connected resistor and a capacitor when the circuit shown in FIG. 2 is divided into two.

When the circuit shown in FIG. 2 is divided into two along the dash dot line l, the equivalent circuit of the coupling capacitor $(C_{AB})8$ is expressed as series connected two capacitors $2C_{AB}$ as shown in FIG. 3A, and the equivalent circuit of the series connected resistor 9 and the capacitor 10 are expressed as shown in FIG. 3B. Therefore, the equivalent circuit of the transconductance amplifier 11 and a half of the resistor 9 is as illustrated in FIG. 3C.

Figure 3C:
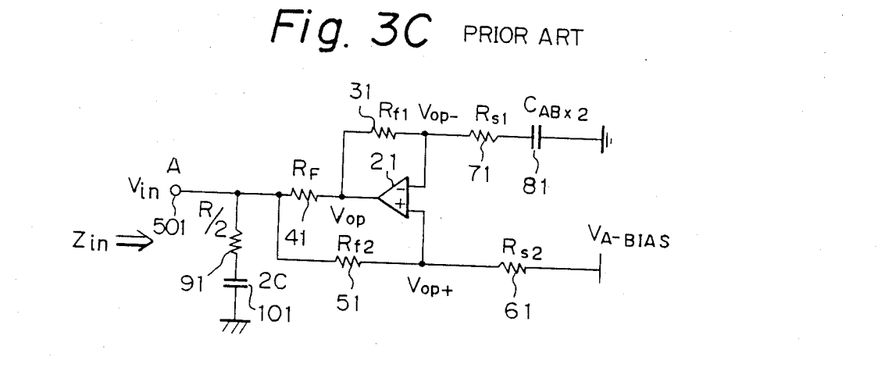
FIG. 3C is the equivalent circuit diagram of half of the circuit shown in FIG. 2.

For the sake of easy explanation, the description is given for the equivalent circuit shown in FIG. 3C.

In FIGS. 2 and 3C, the same reference numerals and symbols represent the same parts. The coupling capacitor 81 has a capacitance twice that of the coupling capacitor 8 in FIG. 2; the resistor 91 has a resistance R/2, half that of the resistor 9 in FIG. 2; and the capacitor 101 has a capacitance 2C twice that of the capacitor 10 in FIG. 2. In the equivalent circuit shown in FIG. 3, the input impedance $Z_{in}$ when viewed from the tip line terminal (A) 501 is obtained as follows.

First, when an input voltage $V_{in}$ is applied to the tip line terminal (A) 501, the voltage $V_{OP+}$ at the noninverting input terminal of the operational amplifier 22 is divided by the resistors $R_{f2}$ and $R_{s2}$. The voltage at the inverting input terminal $V_{OP-}$ of the operational amplifier 22 is expressed as $V_{OP+}=V_{OP-}$ because of the imaginary short of the operational amplifier 21. Further, when the impedance $C_{AB}$ of the coupling capacitor 8 is determined to be negligible in comparison with the resistance $R_{s1}$, the output voltage $V_{OP}$ of the operational amplifier 21 can be calculated as follows:

$$V_{OP-} = V_{OP+} = \frac{R_{s2}}{R_{f2} + R_{s2}} \times V_{in} \quad (1)$$

$$V_{OP} \times \frac{R_{s1}}{R_{f1} + R_{s1}} = V_{OP-} \quad (2)$$

From the expressions (1) and (2), $$V_{OP} = \frac{R_{f1} + R_{s1}}{R_{s1}} \times V_{OP-}$$

$$= \frac{R_{f1} + R_{s1}}{R_{s1}} \times \frac{R_{s2}}{R_{f2} + R_{s2}} \times V_{in}$$

Here, assuming that $R_{f1}=R_{f2}=R_{s1}=R_{s2}$ or $R_{f1}/R_{f2}=R_{s1}/R_{s2}$, then, $V_{OP}=V_{in}$ is obtained.

In the equivalent circuit shown in FIG. 3, the voltage at the left hand side of the resistor $R_F$ is $V_{in}$ and the voltage at the right hand side of the resistor $R_F$ is $V_{OP}$, which is equal to $V_{in}$. Therefore, the voltage across the resistor $R_F$ is zero, and thus no current flows through the resistor $R_F$. Accordingly, the input impedance of the right side circuit when viewed from the resistor $R_F$ is infinite. In conclusion, the impedance of the equivalent circuit when viewed from the tip line terminal 501 is $R_{f2}+R_{s2}$. The resistance of the circuit for a direct current is expressed as:

$$R_F \times 1 + \frac{R_{s2}}{R_{f2}}$$

For the operational amplifier 12 shown in the upper side in FIG. 2, a similar calculation as shown above can be applied. Accordingly, the input impedance $Z_{in}$ between the tip line terminal 501 and the ring line terminal 502 is $(R+1/j\Omega C)$.

Therefore, the input impedance $Z_{in}$ of the battery feed circuit shown in FIG. 2 is formed by the impedance of the resistor 9 and the capacitor 10. The value of the input impedance is determined to be 600 Ω+2 μF or 900 Ω+2 μF as mentioned before, to match the load. Since the capacitance 2 μF is a large capacitance, it is realized by a large size part.

When the load is not a subscriber line but is a transmission line such as a trunk line and the like, the input impedance $Z_{in}$ should be substantially a pure resistance R. In the voice band between 200 Hz to 3.4 KHz, the resistance R should satisfy the condition:

$$R >> \frac{1}{2\pi f C}$$

To satisfy the above condition, the capacitance C should be more than 10 μF. In this case, the capacitor becomes larger in size and it becomes difficult to mount it on the circuit board of the battery feed circuit.

In the above-described conventional circuit, the resistor 9 and the capacitor 10 are connected in series between the tip line terminal 501 and the ring line terminal 502. The capacitor 10 should have a high tolerance voltage, a large capacitance, and a high precision, and therefore, the capacitor must be large. Thus a problem arises of a large circuit scale of the battery feed circuit as a whole.

Accordingly, an object of the present invention is to provide a terminating circuit of a battery feed circuit having a stable terminating impedance without using large-size parts. This is accomplished by appropriately setting an impedance connected to an operational amplifier in a transconductance amplifier in the battery feed circuit so that the impedance is equal to the terminating impedance of the lines when viewed from the output side of the operational amplifier.

In the above described conventional circuit, the resistances $R_{f1}$, $R_{s1}$, $R_{f2}$, and $R_{s2}$ are determined in such a way that the input impedance of the battery feed circuit constructed by the operational amplifiers is infinite. Nevertheless, by appropriately adjusting the resistances to bring the input impedance to the desired value, the conventionally connected resistor 9 and the capacitor 10 can be deleted.

Figure 4:
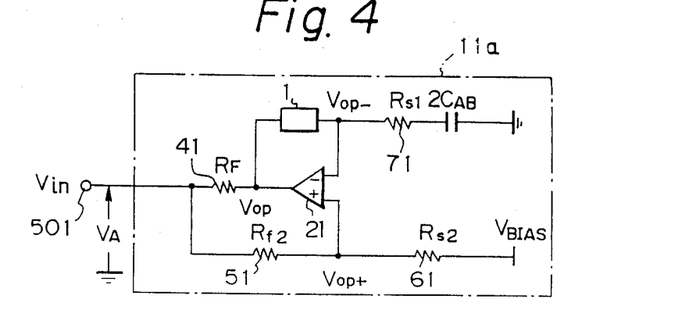
FIG. 4 is a circuit diagram for explaining the principle of the present invention.

FIG. 4 is a circuit diagram for explaining the principle of the present invention. In FIG. 4, 11a is a transconductance amplifier connected to a tip line terminal 501 or a ring line terminal 502; 21 is an operational amplifier in the transconductance amplifier 11a; 41 is a reference resistor, connected between the output of the operational amplifier 21 and the tip line terminal 501 or the ring line terminal 502, for determining the input impedance of the transconductance amplifier 11a; and 51 and 52 are voltage-dividing resistors. According to the present invention, the impedance unit 1 is connected between the inverting input terminal and the output terminal of the operational amplifier 21 so that the terminating impedance of the battery feed circuit when viewed from the tip line terminal and the ring line terminal is formed by only the reference resistor 41 and the impedance unit 1.

As explained in more detail in the following description of the embodiments, since the terminating impedance of the battery feed circuit is determined by only the reference resistor 41 and the impedance unit 1, the conventionally required large capacitance capacitor is not needed. The desired input impedance can be set by setting the voltage $V_{OP}$ at the right hand side of the resistor $R_F$ to a specific value by using the impedance unit 1, instead of setting the voltage $V_{in}$ at the left hand side of the resistor $R_F$ and the voltage $V_{OP}$ at the right hand side of the resistor $R_F$ to be equal as in the conventional circuit.

Figure 5:
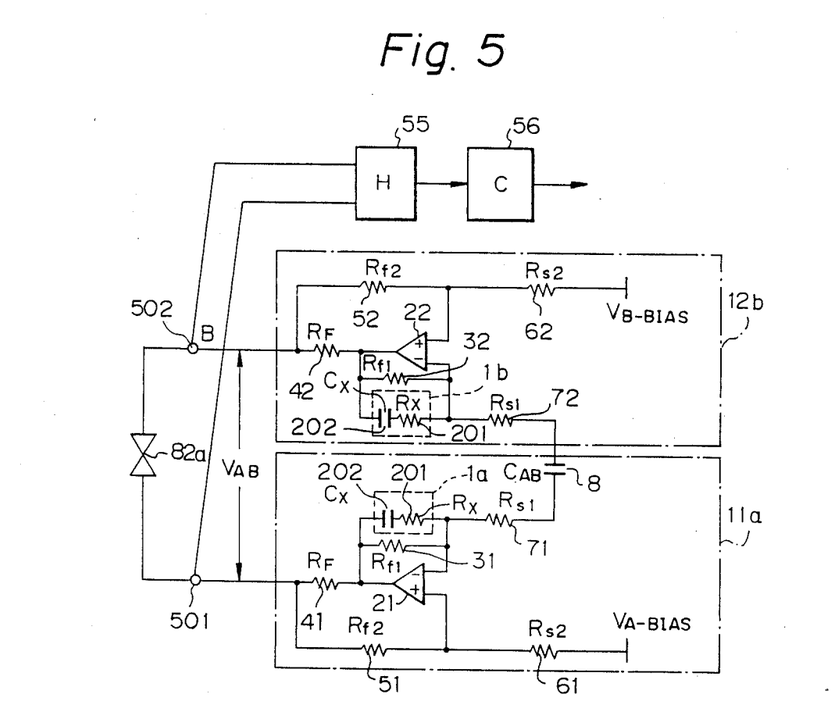
FIG. 5 is a circuit diagram of a terminating circuit according to a first embodiment of the present invention.

FIG. 5 is a circuit diagram of a terminating circuit according to a first embodiment of the present invention. In the figure, the same parts as those in the conventional circuit shown in FIG. 2 are denoted by the same reference numbers. In each of the transconductance amplifiers 11a and 12a, the difference from the conventional circuit is that a series circuit including a resistor ($R_x$) 201 and a capacitor ($C_x$) 202 connected in series is connected in parallel with the feedback resistor 31 or 32, subscriber terminal 82a is connected between the tip line terminal 501 and the ring line terminal 502, and a hybrid circuit 55 is connected between the tip line terminal 501 and the ring line terminal 502. A CODEC 56 is connected to the hybrid circuit 55.

When a differential signal of a speech sound is input between the tip line terminal 501 and the ring line terminal 502, the input impedance of the battery feed circuit is calculated as follows.

As an assumption, the resistances and the capacitances of the corresponding parts in the upper and lower circuits are the same. Namely, the resistances $R_{f1}$, $R_{f2}$, $R_{s1}$, $R_{s2}$, and $R_x$ and the capacitance $C_x$ in the upper and lower transconductance amplifiers are assumed to be respectively the same.

When a differential signal is input between the tip line terminal 501 and the ring line terminal 502, i.e., between the lines A and B, the voltage between an end of the capacitor $C_{AB}$ and the ground does not change. Therefore, for an alternating current, the potentials of the ends of the capacitor $C_{AB}$ and the potential of the ground G are the same. Since the upper and the lower circuits are symmetric, the following analysis is applied to the lower transconductance amplifier 11a in the circuit shown in FIG. 5. The lower transconductance amplifier 11a is substantially equivalent to the principle circuit shown in FIG. 4.

The voltage $V_{OP}^+$ at the non-inverting input of the operational amplifier 21 is expressed as:

$$V_{OP+} = V_{in} \times \frac{R_{s2}}{(R_{f2} + R_{s2})}$$

The output voltage $V_{OP}$ of the operational amplifier 21 is expressed as:

$$V_{OP} = V_{in} \times \frac{R_{s2}}{(R_{f2} + R_{s2})} \times \left(1 + \frac{Z_u}{R_{s1}}\right)$$

Assuming that the resistances $R_{f2}$ and $R_{s2}$ have a high resistance, then the current flowing through the resistors $R_{f2}$ and $R_{s2}$ can be neglected, and thus the input current $I_{in}$ flowing through the resistor $R_F$ expressed as:

$$I_{in} = \frac{V_{in} - V_{OP}}{R_F}$$

The impedance Z of the battery feed circuit is:

$$Z = \frac{V_{in}}{I_{in}} = \frac{R_F}{1 - \frac{R_{s2}}{R_{f2} + R_{s2}} \times \left(1 + \frac{Z_u}{R_{s1}}\right)}$$

Assuming that $R_{f2} = R_{s2} = R_{s1}$, then the impedance Z is:

$$Z = \frac{2R_F \times R_{s1}}{R_{s1} - Z_u}$$

The impedance $Z_u$ is obtained from the series circuit consisting of the resistor $R_x$ and the capacitor $C_x$ and the resistor $R_{f1}$ connected in parallel with the series circuit. Therefore, the resistance $Z_u$ is expressed as:

$$Z_u = \frac{R_{f1} \times \left(R_x + \frac{1}{j\omega C_x}\right)}{R_{f1} + R_x + \frac{1}{j\omega C_x}}$$

Assuming that $R_{f1} = R_{s1}$, then the terminating impedance Z of the battery feed circuit is expressed as:

$$Z = 2 \times \frac{R_F}{R_{f1}} (R_{f1} + R_x) + 2 \times \frac{R_F}{R_{f1}} \times \frac{1}{j\omega C_x}$$

If a complex terminating impedance of, for example, 600 Ω + 2.16 μF, is required, the impedance required in one of the transconductance amplifiers is 300 Ω + 4.32 μF.

As an example, if $R_F = 50$ Ω and $R_{f1} = R_{s1} = R_{f2} = R_{s2} = 100$ KΩ, then the resistance $R_x$ is 200 KΩ and the capacitance $C_x$ is 4320 pF.

As apparent from the above description, the large capacitance of 2 μF is not necessary in the above embodiment, i.e., only a small capacitance of 4320 pF is required. Accordingly, the complex terminating circuit can be stably realized by a small capacitance capacitor. The capacitance $C_x$ is very small in comparison with the large capacitance of 2 μF necessary in the conventional circuit. Therefore, the circuit shown in FIG. 5 enables a miniaturizing of the battery feed circuit.

Figure 6:
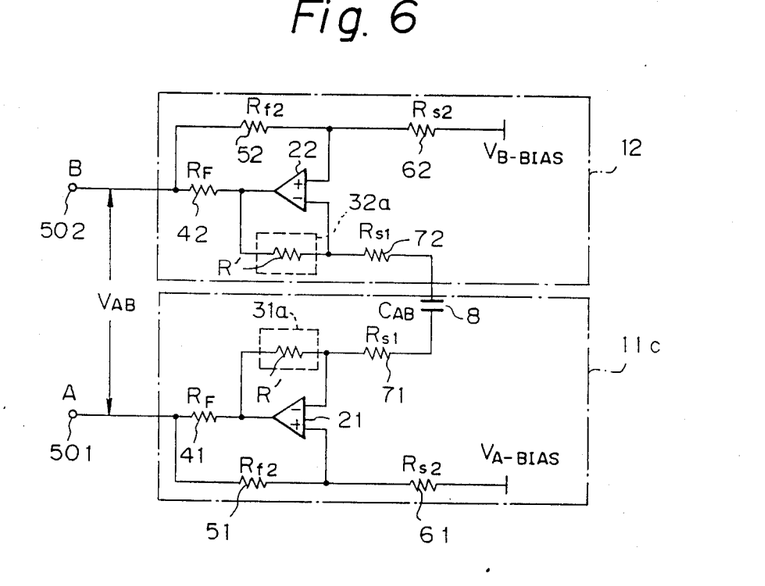
FIG. 6 is a circuit diagram of a terminating circuit according to a second embodiment of the present invention.

FIG. 6 is a circuit diagram of a terminating circuit according to a second embodiment of the present invention. In the second embodiment, the explanation is given for when the terminating impedance of the battery feed circuit is a pure resistance R as required in transmission lines such as trunk lines. In the circuit in FIG. 6, the same parts as in FIG. 2 are denoted by the same reference numerals. The differences from the circuit in FIG. 2 are that the resistor and the capacitor for the terminating impedance are not connected between the tip line terminal 501 and the ring line terminal 502, and the feedback resistors (R') 31a and 32a are connected instead of the feedback resistors $R_{f1}$.

By this configuration, the terminating impedance necessary for the battery feed circuit can be realized without using a large capacitance capacitor. In this case, the output voltage of the operational amplifier is now explained with reference to an equivalent circuit shown in FIG. 7.

Figure 7:
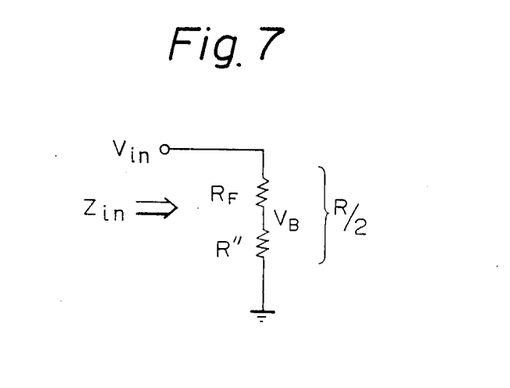
FIG. 7 is an equivalent circuit diagram of the circuit shown in FIG. 6.

To set the input impedance $Z_{in}$ to be a pure resistance R/2, the potential $V_B$ at the connecting point between the resistor $R_F$ and the resistor R" is made equal to the potential $V_{OP}$, when it is assumed that $R/2 = R_F + R$. In FIG. 7, it will be seen that the following equation is established.

$$V_B = \frac{R''}{R/2} V_{in}$$
$$= \frac{R/2 - R_F}{R/2} V_{in}$$
$$= \frac{R - 2R_F}{R} V_{in}$$

In FIG. 6, the upper circuit and the lower circuit are symmetric with respect to the capacitor $C_{AB}$. Therefore, the equivalent circuit of the transconductance amplifier is the same as the circuit shown in FIG. 4.

When the input voltage $V_{in}$ is input, the non-inverting input voltage $V_{OP+}$ is a voltage divided value by the resistors $R_{f2}$ and $R_{s2}$. The input voltages $V_{OP+}$ and $V_{OP-}$ become the same due to the imaginary short of the operational amplifiers.

When the impedance of the capacitance $C_{AB}$ is determined to be negligible in comparison with the resistance $R_{s1}$, the output voltage $V_{OP}$ or the operational amplifier is calculated as follows:

$$V_{OP+} = V_{OP-} = \frac{R_{s2}}{R_{f2} + R_{s2}} \times V_{in}$$

$$V_{OP+} \times \frac{R_{s1}}{R' + R_{s1}} = V_{OP-}$$

$$V_{OP} = \frac{R' + R_{s1}}{R} \times V_{OP-}$$
$$= \frac{R' + R_{s1}}{R_{s1}} \times \frac{R_{s2}}{R_{f2} + R_{s2}} \times V_{in}$$

Here, assuming that $R_{s1} = R_{s2} = R_{f2} = R_s$, then the output voltage $V_{OP}$ is:

$$V_{OP} = \frac{R' + R_s}{R_s} \times \frac{R_s}{2R_3} \times V_{in}$$
$$= \frac{R' + R_s}{2R_s} \times V_{in}$$

To realize $V_{OP} = V_B$, it is sufficient to satisfy the relationship:

$$\frac{R' + R_s}{2R_3} = \frac{R - 2R_F}{R}$$

Further, the resistance R' is:

$$R' = \frac{R - 4R_F}{R} \times R_s$$

Accordingly, by determining the resistance R' as above, the resistor R and the capacitor C can be deleted from the conventional circuit, but even when the resistor and the capacitor are deleted, the battery feed characteristic is the same as in the conventional circuit.

In conclusion, in the circuit construction shown in FIG. 6, by setting the input impedance of the half line circuit to be R/2, the resistor R and the capacitor C, which are connected outside of the battery feed circuit, can be deleted. In particular, when the terminating impedance is a pure resistance, the capacitance C necessary in the conventional circuit is very large but according to the second embodiment of the present invention, the capacitor C is not necessary. Still further, according to the second embodiment of the present invention, since the capacitor C used in the conventional circuit is not used, the terminating resistance can be realized by a pure resistance.

As described above, according to the present invention, by adjusting the feedback resistance of an operational amplifier included in a transconductance amplifier to an appropriate impedance, the input impedance of the transconductance amplifier is made a finite value, whereby the conventionally required large capacitance capacitor for the terminating impedance becomes unnecessary. As a result, the circuit scale of the battery feed circuit in an electronic exchange system can be largely reduced.

We claim:

1. A terminating circuit in a battery feed circuit of an electronic exchange system, said battery feed circuit comprising:
   a coupling capacitor;
   two transconductance amplifiers, connected by said coupling capacitor, for supplying a direct current through a ring terminal and a tip terminal to a load, each of said transconductance amplifiers comprising:
   an operational amplifier having an inverting input terminal, a noninverting input terminal, and an output terminal;
   a first resistor $R_F$ connected between said output terminal of said operational amplifier and said tip terminal or said ring terminal; and
   impedance means connected between said inverting input terminal and said output terminal of said operational amplifier, said impedance means comprising:
   a second resistor; and
   a capacitor connected in series with said resistor;
   said impedance means in each of said two transconductance amplifiers having an impedance determined such that a terminating impedance of the battery feed circuit when viewed from said tip terminal and said ring terminal is formed only by the elements in said two transconductance amplifiers including said impedance means and said first resistor.

2. A terminating circuit as claimed in claim 1, wherein each of said transconductance amplifiers further comprises:
a feedback resistor connected between said inverting input terminal of said operational amplifier and said output terminal of said operational amplifier;
a first voltage-dividing resistor connected between said noninverting input terminal of said operational amplifier and said tip terminal or said ring terminal;
a second voltage-dividing resistor connected between said noninverting input terminal of said operational amplifier and a power supply; and
a connecting resistor connected between said inverting input terminal of said operational amplifier and said coupling capacitor.

3. A terminating circuit as claimed in claim 2, wherein said transconductance amplifiers are symmetric to each other so that the resistances of said feedback resistor, said first voltage-dividing resistor, said second voltage dividing resistor, and said connecting resistor in a first one of said two transconductance amplifiers are respectively the same as those in a second one of said two transconductance amplifiers.

4. A terminating circuit as claimed in claim 3, wherein the ends of said coupling capacitor can be deemed as ground for an alternating input signal applied between said ring terminal and said tip terminal.

5. A terminating circuit as claimed in claim 4, wherein when the resistances of said feedback resistor, said first voltage-dividing resistor, said second voltage dividing resistor, and said connecting resistor are respectively expressed as $R_{f1}$, $R_{f2}$, $R_{s2}$, and $R_{s1}$, the voltage at said noninverting input terminal of one of said operational amplifiers is expressed as:

$$V_{OP+} = V_{in} \times \frac{R_{s2}}{(R_{f2} + R_{s2})},$$

where $V_{in}$ represents the input voltage applied to said tip terminal.

6. A terminating circuit as claimed in claim 5, wherein when the resistances of said feedback resistor, said first voltage-dividing resistor, said second voltage dividing resistor, and said connecting resistor are respectively expressed as $R_{f1}$, $R_{f2}$, $R_{s2}$, and $R_{s1}$, and the parallel impedance of said impedance means and said feedback resistor is expressed as Zu, the output voltage $V_{OP}$ of one of said operational amplifiers is expressed as:

$$V_{OP} = V_{in} \times \frac{R_{s2}}{(R_{f2} + R_{s2})} \times \left(1 + \frac{Z_u}{R_{s1}}\right).$$

7. A terminating circuit as claimed in claim 6, wherein the current through said first and second voltage dividing resistors $R_{f2}$ and $R_{s2}$ is negligible so that the input current $I_{in}$ flowing through said first resistor $R_F$ is expressed as:

$$I_{in} = \frac{V_{in} - V_{OP}}{R_F}.$$

8. A terminating circuit as claimed in claim 7, wherein the input impedance Z of said battery feed circuit is expressed as:

$$Z = \frac{V_{in}}{I_{in}} = \frac{R_f}{1 - \frac{R_{s2}}{R_{f2} + R_{s2}} \times \left(1 + \frac{Z_u}{R_{s1}}\right)}.$$

9. A terminating circuit as claimed in claim 8, wherein when $R_{f1} = R_{f2} = R_{s2} = R_{s1}$, the input impedance Z of said battery feed circuit is expressed as:

$$Z = 2 \times \frac{R_F}{R_{f1}} (R_{f1} + R_x) + 2 \times \frac{R_F}{R_{f1}} \times \frac{1}{j\omega C_x}$$

where $R_x$ is a resistance component in said impedance means and $C_x$ is a capacitance component in said impedance means.

10. A terminating circuit in a battery feed circuit of an electronic exchange system, said battery feed circuit comprising:
a coupling capacitor;
two transconductance amplifiers, connected by said coupling capacitor, for supplying a direct current through a ring terminal and a tip terminal to a load, each of said transconductance amplifiers comprising:
an operational amplifier having an inverting input terminal, a noninverting terminal and an output terminal;
a first resistor connected between said output terminal of said operational amplifier and said tip terminal or said ring terminal;
impedance means connected between said inverting input terminal and said output terminal of said operational amplifier, said impedance means consisting of a feedback resistor;
a first voltage-dividing resistor connected between said noninverting input terminal of said operational amplifier and said tip terminal or said ring terminal.
a second voltage-dividing resistor connected between said noninverting input terminal of said operational amplifier and a power supply;
a connecting resistor, connected between said inverting input terminal of said operational amplifier and an end of said coupling capacitor, the ends of said coupling capacitor can be deemed as ground for an alternating input signal applied between said ring terminal and said tip terminal;
said two transconductance amplifiers are symmetric to each other so that the resistance of said feedback resistor, said first voltage-dividing resistor, said second voltage dividing resistor and said connecting resistor in a first one of said two transconductance amplifiers are respectively the same as those in a second one of said two transconductance amplifiers,
when the resistance of said first voltage-dividing resistor, said second voltage dividing resistor, and said connecting resistor are respectively expressed as $R_{F2}$, $R_{S2}$, and $R_{S1}$, the voltage at the noninverting input terminal of one of said operational amplifiers is expressed as:

$$V_{OP+} = V_{in} \times \frac{R_{s2}}{(R_{F2} + R_{s2})},$$

where $V_{in}$ represents the input voltage applied to said tip terminal.

11. A terminating circuit as claimed in claim 10, wherein when the resistances of said feedback resistor, said first voltage-dividing resistor, said second voltage dividing resistor, and said connecting resistor are respectively expressed as R', $R_{f2}$, $R_{s2}$, and $R_{s1}$, the output voltage $V_{OP}$ of one of said operational amplifiers is expressed as:

$$V_{OP} = \frac{R' + R_{s1}}{R_{s1}} \times \frac{R_{s2}}{R_{f2} + R_{s2}} \times V_{in}.$$

12. A terminating circuit as claimed in claim 11, wherein when the resistance of said first voltage-dividing resistor, said second voltage dividing resistor, and said connecting resistor are the same as a resistance $R_s$, and when the resistance of said feedback resistor is expressed as R', then the output voltage $V_{OP}$ of said operational amplifier is expressed as:

$$V_{OP} = \frac{R' + R_s}{2R_s} \times V_{in}$$

wherein $V_{in}$ is the output voltage applied between said tip terminal or said ring terminal and ground.

13. A terminating circuit as claimed in claim 12, wherein when the required terminating impedance is expressed as R, the input voltage is expressed as $V_{in}$, and the resistance of said resistor connected between the output end of said operational amplifier and said tip terminal or said ring terminal is expressed as $R_F$, then the voltage $V_B$ at the output end of said operational amplifier is expressed as:

$$V_B = \frac{R - 2R_F}{R} V_{in}.$$

14. A terminating circuit as claimed in claim 13, wherein the resistance R' of said feedback resistor is expressed as:

$$R' = \frac{R - 4R_F}{R} \times R_s.$$

* * * * *

UNITED STATES PATENT AND TRADEMARK OFFICE
CERTIFICATE OF CORRECTION

PATENT NO. : 4,982,422

DATED : JANUARY 1, 1991

INVENTOR(S) : SHIN-ICHI ITOH ET AL.

It is certified that error appears in the above-identified patent and that said Letters Patent is hereby corrected as shown below:

Col. 4, line 22, "(R + 1/jΩC)." should be --(R + 1/jωC).--.

Col. 10, line 44, "terminal." should be --terminal;--.

Signed and Sealed this

Twelfth Day of May, 1992

*Attest:*

DOUGLAS B. COMER

*Attesting Officer*     *Acting Commissioner of Patents and Trademarks*